(12) United States Patent
Bradley et al.

(10) Patent No.: US 8,128,887 B2
(45) Date of Patent: Mar. 6, 2012

(54) METAL-BASED COATINGS FOR INHIBITING METAL CATALYZED COKE FORMATION IN HYDROCARBON CONVERSION PROCESSES

(75) Inventors: Steven A. Bradley, Arlington Heights, IL (US); Robert B. James, Jr., Northbrook, IL (US); David W. Alley, Haddam, CT (US)

(73) Assignee: UOP LLC, Des Plaines, IL (US)

( * ) Notice: Subject to any disclaimer, the term of this patent is extended or adjusted under 35 U.S.C. 154(b) by 515 days.

(21) Appl. No.: 12/205,290

(22) Filed: Sep. 5, 2008

(65) Prior Publication Data

US 2010/0061902 A1    Mar. 11, 2010

(51) Int. Cl.
- B01J 19/00 (2006.01)
- B01J 8/02 (2006.01)
- B01J 35/02 (2006.01)
- B05D 3/02 (2006.01)
- B32B 15/00 (2006.01)
- B32B 15/01 (2006.01)

(52) U.S. Cl. ........ 422/240; 422/211; 422/212; 422/241; 427/376.8; 428/650; 428/666; 428/680

(58) Field of Classification Search .......... 422/240–241, 422/211, 212; 427/376.8; 428/650, 666, 428/680, 698; 208/120.01; 106/287.17
See application file for complete search history.

(56) References Cited

U.S. PATENT DOCUMENTS

| | | | |
|---|---|---|---|
| 3,827,967 A | 8/1974 | Nap et al. | 208/48 R |
| 4,404,087 A | 9/1983 | Reed et al. | 208/48 AA |
| 5,405,525 A | 4/1995 | Heyse et al. | 208/133 |
| 5,406,014 A | 4/1995 | Heyse et al. | 585/444 |
| 5,413,700 A | 5/1995 | Heyse et al. | 208/134 |
| 5,565,087 A | 10/1996 | Brown et al. | 208/48 R |
| 5,593,571 A | 1/1997 | Heyse et al. | 208/134 |
| 5,658,452 A | 8/1997 | Heyse et al. | 208/48 R |
| 5,674,376 A | 10/1997 | Heyse et al. | 208/135 |
| 5,676,821 A | 10/1997 | Heyse et al. | 208/135 |
| 5,807,842 A | 9/1998 | Buscemi et al. | 208/47 |
| 5,849,969 A | 12/1998 | Heyse et al. | 585/483 |
| 5,863,418 A | 1/1999 | Heyse et al. | 208/135 |
| 5,866,743 A | 2/1999 | Heyse et al. | 585/486 |
| 5,914,028 A | 6/1999 | Wilson et al. | 208/139 |
| 5,952,769 A | 9/1999 | Budaragin | 313/141 |
| 6,019,943 A | 2/2000 | Buscemi et al. | 422/8 |
| 6,063,264 A | 5/2000 | Haritatos | 208/137 |
| 6,139,909 A | 10/2000 | Hagewiesche | 427/142 |
| 6,143,166 A | 11/2000 | Nacamuli | 208/65 |
| 6,274,113 B1 | 8/2001 | Heyse et al. | 423/418.2 |
| 6,419,986 B1 | 7/2002 | Holtermann et al. | 427/250 |
| 6,482,311 B1 | 11/2002 | Wickham et al. | 208/48 AA |
| 6,537,343 B2 * | 3/2003 | Majagi et al. | 75/240 |
| 6,544,439 B1 | 4/2003 | Lewis et al. | 252/373 |
| 6,548,030 B2 | 4/2003 | Heyse et al. | 422/240 |
| 6,551,660 B2 | 4/2003 | Holtermann et al. | 427/250 |
| 6,602,483 B2 | 8/2003 | Heyse et al. | 423/418.2 |
| 6,737,556 B2 | 5/2004 | Jones et al. | 585/638 |
| RE38,532 E | 6/2004 | Heyse et al. | 585/486 |
| 6,803,029 B2 | 10/2004 | Dieckmann | 423/652 |
| 6,884,515 B2 * | 4/2005 | Ackerman et al. | 428/469 |
| 7,041,617 B2 | 5/2006 | Jensen et al. | 502/113 |
| 7,211,292 B1 | 5/2007 | Budaragin | 427/227 |
| 2002/0041928 A1 | 4/2002 | Budaragin | 427/229 |
| 2002/0192494 A1 * | 12/2002 | Tzatzov et al. | 428/655 |
| 2003/0157363 A1 * | 8/2003 | Rigney et al. | 428/680 |
| 2004/0253438 A1 | 12/2004 | Budaragin et al. | 428/336 |
| 2007/0015002 A1 | 1/2007 | Narula et al. | 428/668 |
| 2007/0071992 A1 * | 3/2007 | Okoroafor | 428/632 |
| 2007/0203383 A1 | 8/2007 | Bozzano et al. | 585/639 |
| 2009/0011252 A1 * | 1/2009 | Stein et al. | 428/446 |
| 2009/0166259 A1 * | 7/2009 | Bradley et al. | 208/120.01 |

FOREIGN PATENT DOCUMENTS

| | | |
|---|---|---|
| WO | 03/072491 | 9/2003 |
| WO | 2004/104261 | 12/2004 |
| WO | 2007/009104 A2 | 1/2007 |

OTHER PUBLICATIONS

Stair, Peter C. et al., "In-Situ Studies of Coke Formation Chemistry in the Methanol-to-Hydrocarbons Reaction Catalyzed by H-MF1," Dept. of Chemistry and Center for Catalysis and Surface Science, Northwestern Univ., Evanston, IL (Abstract Included).
Curtailing Coke Formation in Ethylene Furnace Tubes—Process Evaluation/Research Planning, http://nexant.ecnext.com/coms2/gi_0255-146/Curtailing-Coke-Formation-in-Ethylene.html, publication date Jun. 4, 2003. (Abstract Included).
Zhou, Lubo, BP-UOP Cyclar Process, Des Plaines, IL, Chapter 2.4.
Lapinski, Mark et al., "Process Evolution", UOP Platforming Process, Des Plaines, IL, Chapter 4.1.
Gregor, Joseph et al., UOP Oleflex Process for Light Olefin Production, Des Plaines, IL, Chapter 5.1.
Walters, Kent and Russo, Al, Metallurgical Bond Evaluation Methods for Diodes, Micronotes #030.
Spitzig, Willilam A and Grisaffe, Salvatore J., Metallurgical Bonding of Plasma-Sprayed Tungsten on Hot Molybdenum Substrates, Lewis Research Center, Cleveland, OH, NASA Technical Note, Nov. 1964.
Office Action dated Oct. 5, 2010 for U.S. Appl. No. 12/101,778, Steven Bradley.

* cited by examiner

*Primary Examiner* — Walter D Griffin
*Assistant Examiner* — Natasha Young
(74) *Attorney, Agent, or Firm* — Mark R Willis

(57) ABSTRACT

A coating applied to at least a portion of the surfaces of reactors, reactor internals, other reactor components, and/or heater tubes is provided in order to minimize the formation of metal catalyzed coke in hydrocarbon conversion processes operating at temperatures at about 350° C. (662° F.) or greater and in reducing environments. These coatings may comprise Nickel coatings or complexes thereof, such as Ni—Al, Ni—Cr/Cr carbide, as well as aluminum painted coatings that are applied in a reduction cure process (e.g., application temperatures of about 600° C. (1112° F.)). Additionally, where $H_2S$ is necessary for the process, such as to minimize thermal cracking, the coatings also reduce corrosion of base metal due to sulfidation attack and eliminate the requirement of continuous replacement of reactor internals and other components.

3 Claims, No Drawings

METAL-BASED COATINGS FOR INHIBITING METAL CATALYZED COKE FORMATION IN HYDROCARBON CONVERSION PROCESSES

BACKGROUND OF THE INVENTION

This invention generally relates to metal-based coatings to inhibit metal catalyzed coke formation on metal alloy surfaces of process equipment used in hydrocarbon conversion processes.

Hydrocarbon conversion processes typically require reactor systems, and associated conduits and piping, adapted for hydrocracking, reforming, fluid catalytic cracking, and other similar processes. At the process conditions and temperatures that are required for hydrocarbon conversion, solid carbonaceous materials, referred to as coke, typically form on the metal alloy surfaces of the reactor components and associated equipment due to metal catalyzed reactions at the metal alloy surfaces. The formation of metal catalyzed coke deposits is influenced by factors such as the content of the hydrocarbon feed, the conversion process, the specific reaction conditions, and the material and configuration of the reactor and associated equipment.

For many hydrocarbon processes in refining and petrochemical services, as typically employed, metal catalyzed coke deposits commonly occur at appreciable rates from about 350° C. (662° F.) to about 850° C. (1562° F.). The formation of metal catalyzed coke deposits for a particular process is dependent upon the process conditions, the composition of the hydrocarbon stream, the compositions of the metal surfaces in contact with the hydrocarbon stream, the amount of time that the metal and hydrocarbon stream are in contact, and other similar considerations. The temperature at which a process will produce metal catalyzed coke can be referred to as the metal catalyzed coke onset temperature. If a process is operated at temperatures greater than the coke onset temperature, the build up of metal catalyzed coke deposits can cause a number of significant problems within a reactor and associated equipment, and may result in severe heat transfer reductions, undesirable pressure drops within the process, loss of process efficiencies, and premature shut down of the conversion process.

Excess metal catalyzed coke build-up, for example, can cover catalyst sites, plug catalyst pores, and clog catalyst screens retaining the catalyst within the reactor. Such excess deposits also can build-up on other reactor internal components and accumulate in the piping and passages within the reactor and associated equipment. Thus, such deposits can reduce catalyst activity, interfere with the efficient transfer of heat through heated or heat exchanging surfaces, and can create significant product flow reductions. Accordingly, metal catalyzed coke deposits can become sufficiently severe to require the premature shut down of the hydrocarbon conversion process to regenerate the catalyst, and to decoke and replace reactor and other surfaces subject to the coke deposits, as well as those damaged components by coking and associated reactions.

Metals that catalyze the coke formation may reside on or in the catalyst, may come from the process equipment, or can exist in the feed stream. Typical catalyzing metals include: Mn, Fe, Ru, Os, Co, Rh, Ir, Ni, Pd, Pt, and Cu, among others. Such metals and their alloys are frequently used in hydrocarbon conversion reactors and related equipment and therefore often provide reaction sites for metal catalyzed coke formation. For instance, where a reactor or related components are austenitic stainless steel 300-series, the iron, chromium, and/or nickel metal alloys of the stainless steel provide the sites and surfaces for precipitates of metal catalyzed coke at the operating conditions and temperatures used for hydrocarbon conversion processes.

Use of process temperatures below metal catalyzed coke onset temperatures, may help reduce or eliminate metal catalyzed coke formation, but the use of such reduced temperatures often is not desirable. Many hydrocarbon conversion processes require or benefit from temperatures approaching or exceeding the coke onset temperature to obtain efficient conversion rates and desired hydrocarbon conversion products and product mixes. Often methods for reducing coke formation, such as using antifoulant additives, applying coatings to the inside of the process equipment or combining the metal alloys of the process equipment with an anti-coking agent have met with limited success.

In some instances, sulfur or sulfur compositions are used to inhibit metal catalyzed coke formation at the metal alloy surfaces of reactors and associated equipment. The introduction of sulfur can raise the coke on-set temperature and thus prevents metal catalyzed coke at the operating temperature by increasing the coke on-set temperature to above the operating temperature, however, sulfidation attack of the metal then can become a concern. Such sulfur compositions used as metal catalyzed coking inhibitors typically are introduced by addition to the initial hydrocarbon stream and may be added during the conversion process. Where the sulfur inhibitors are provided by addition, they typically are supplied by the addition of dimethyl sulfide ($C_2H_6S$) or dimethyldisulfide ($C_2H_6S_2$) to the process stream, which then form hydrogen sulfide ($H_2S$) in the process stream. In such approaches, the typical concentration levels of $H_2S$ typically are from about 0.25 wt. ppm to about 200 wt. ppm. At temperatures above about 350° C. (662° F.), typical reactor materials, such as type 347 stainless steel, are corrosively reactive with $H_2S$ in the hydrocarbon stream as a result of sulfidation reactions between the $H_2S$ and the metals of the metal alloy surfaces. Such corrosion of the metal alloy surfaces can substantially reduce the useful life of the reactor components and related equipment, cause fouling, and interfere with the operation of the hydrocarbon conversion process.

The corrosion rates due to such sulfidation reactions, in some instances, may be relatively low, such as about 1 to about 10 mils per year (mpy). However, certain reactor components, such as catalyst screens and other similar relatively tight tolerance components, nevertheless are adversely affected by such corrosion rates. For example, the catalyst screens used for catalyst containment in many reactors typically have very small slots or spaces, e.g., less than 1.58 mm (1/16 inch) through which a feed stream can pass without carrying the catalyst out of the containment area. Even relatively low corrosion rates can corrode the screens to the point where the slots in the screens are sufficiently enlarged to permit catalyst to escape from behind the screens into other parts of the reactor system.

In some instances, control of the corrosion rate due to the sulfidation attack of the metal alloy surfaces is maintained by providing a sulfur partial pressure that produces a scale or layer of CrS on the metal alloy surfaces to minimize the diffusion of iron (Fe) from the metal alloy to the reactive surface and thereby reduce the available Fe susceptible to sulfidation corrosion. The equipment used in such approaches, however, must contain metal alloys having more than about 15% by weight chromium (Cr) in order to produce a sufficiently continuous Cr-type scale under the typical process conditions. Corrosion rates due to sulfidation may be less for metal alloys with higher levels of Cr than the austenitic stainless steels, but these alloys tend to be quite expensive or are not feasible because of availability, formability or other mechanical property issues.

The majority of the processes that use $H_2S$ to mitigate metal catalyzed coke formation, in addition, do not use process components that contain such high amounts of chromium, such as austenitic stainless steel materials. Where the metal alloy used has lower chromium content, the use of $H_2S$ tends to produce an outer FeS scale on the alloy surfaces that is friable under thermal stresses or catalyst transport through the system. Such friable surfaces can crack or erode causing further corrosion as fresh metal underneath the scale is exposed to a corrosive atmosphere. Enhanced corrosion may occur where Fe diffuses rapidly through the scale to form FeS scale that also can flake off very readily and expose the metal beneath it to more corrosion. Such scale flakes may foul the reactor components causing pressure buildup, loss in reactor efficiency and other such difficulties, and also may ultimately force the premature shutdown of the reactor. Depending on the sulfidation conditions, the inner Cr-rich sulfur scale may have poor adhesion and can flake from the reactor components.

Another approach for processes utilizing sulfur compositions as metal catalyzed coking inhibitors is to fabricate the process equipment from metal alloys rich in aluminum (Al) or silicon (Si). Upon exposure to elevated air temperatures, such alloys produce an outer scale of corrosion resistant $Al_2O_3$ or $SiO_2$. For example, materials such as Haynes Alloy 214 manufactured by Haynes International, Inc. in Kokomo, Ind., evidenced reduced corrosion rates in such processes at coke onset temperatures, but such materials are expensive, difficult to fabricate and are not easily welded.

Some hydrocarbon conversion processes also operate under conditions where the formation of CrS scale on the exposed metal alloy surfaces does not sufficiently reduce the migration of Fe to the exposed surfaces, resulting in excess and deleterious FeS scale formation. The use of a more corrosion resistant alloy often is not feasible under such operating conditions. Under such reaction conditions, in addition, coke can build up on the catalyst over time, requiring the continuous removal of the partially deactivated catalysts from the bottom of the reactor stack for regeneration ex-situ, i.e., not within the reactor. Furthermore, the $C_5$ and $C_6$ content of the feed stream often must be limited and/or treatment of the feed stream carried out to eliminate or minimize coke precursors to reduce the rate of coke formation in the process.

There further are some hydrocarbon conversion processes where sulfur and sulfur composition inhibitors cannot be utilized for metal catalyzed coke reduction. Such processes include those utilizing a platinum-containing catalyst that is susceptible to sulfur poisoning. In such processes, the hydrocarbon feed must have sulfur concentrations less than about 0.1 ppm. To obtain improved performance and process efficiencies, a higher operating temperature often is desired, but the use of such increased temperatures above the threshold for metal catalyzed coke formation results in deleterious coke deposits on the catalysts, reactor components and other related components.

Applying coatings to the exposed surfaces of the equipment for such conversion processes to reduce metal catalyzed coke formation has not proved satisfactory for a number of reasons. For example, coatings tested under conditions comprising normal hexane, 78% $H_2$ and no $H_2S$ at a pressure of about 414 kPa (60 psig) and a temperature of about 560° C. (1040° F.) often failed because the coatings delaminated and/ or the coatings did not prevent metal catalyzed coke formation. In another approach, a tin (Sn) coating that formed a Fe—Sn intermetallic coating on reactor metal surfaces requiring a sulfur-free environment was used. The coating, however, provided little protection from $H_2S$ corrosion and, at times, would react with any $H_2S$ content in the feed stream. A Sn coating also risked poisoning the catalyst in some processes, and the Sn coating could not be used under catalyst regeneration conditions.

In another approach, an aluminum coating may be added to the reactor components by powder and vapor diffusion processes (e.g., Alonizing), such that an aluminum diffusion coating is created. Such a high temperature diffusion process alloys or diffuses Al into the surface of the metal at temperatures above about 800° C. (1472° F.) in order to obtain the appropriate diffusion layer. Such aluminum coatings in combination with steam and $CO_2$ are believed to provide some resistance to coking in certain hydrocarbon processes, such as thermal cracking of hydrocarbon feedstocks. Similarly, a reactor can be used where its metal alloy components already incorporates the Al, and therefore exhibits similar resistance to coking.

Such aluminum coated or aluminum-containing metal systems typically require the addition of carbon dioxide and steam into the process in an effort to oxidize the Al coating/ metal components to provide a coke resistant surface. The metal surfaces normally must contain nickel or cobalt, or both, to support the surface oxidized Al, and this is not effective in reactor systems made of other materials. This approach further resulted in increased operating costs due to the addition of the necessary carbon dioxide and steam. A further concern of such approaches for reducing coke formation is that certain hydrocarbon processes contain feed streams that must be processed under reducing conditions, such that $CO_2$ or CO or other oxidants cannot be allowed in the process.

Such aluminum coated metal alloy surfaces or the aluminum-containing alloy, in addition, may not be resistant to coking, and actually may promote a substantial amount of coking at elevated temperature conditions, for example at temperatures greater than about 427° C. (800° F.). The high temperatures required to apply the aluminum coating onto a reactor by alonizing or other similar techniques also can warp or otherwise damage the reactor components.

SUMMARY OF THE INVENTION

A coating is provided that minimizes and/or prevents the metal catalyzed coke formation in process equipment used in hydrocarbon conversion processes in reducing environments where there are essentially no oxidants present in the process. Such processes typically have operating conditions at about 350° C. (662° F.) or greater, which are often temperatures at which the process is susceptible to metal catalyzed coke formation. In one aspect, the coatings provided herein are metallurgically bonded coatings and can comprise nickel and aluminum complexes, or complexes of nickel, chromium and chromium carbide, and are applied to internal surfaces of the reactor, on reactor components and/or the associated piping.

In another aspect, the coating may comprise an application of aluminum particles in a carrier, such as an aluminum paint, that is cured under reducing conditions at temperatures sufficient to sinter the aluminum. Under these conditions, the aluminum also is metallurgically bonded either directly to the metal alloy surfaces of the reactor, the reactor components and/or associated piping or to a previously applied nickel complex coating on such surfaces.

As a result, the reactor, its components and the associated piping with the coatings will have a longer use life and reduced scaling issues, thus reducing downtime and shutdowns of the process. Reactors will be able to be operated at higher temperatures, which enhances catalyst performance, increases productivity, and makes the process more economical all while reducing the formation of metal catalyzed coke.

The application of the above mentioned coatings are effective under reducing conditions and are resistant to disbonding or delaminating under the process conditions used during the hydrocarbon processes commonly found in petroleum refining. The resilience of the coating disclosed herein allows the process units to operate at high temperatures, such as temperatures greater than about 350° C. (662° F.), and in some aspects from about 427° C. (800° F.) to about 590° C. (1094° F.), which provide for increased efficiency of the process and/or catalyst used while maintaining the efficacy of the coating. Additionally, the coating permits the use of sulfur compositions, such as $H_2S$, as coking inhibitors or for other reasons, as the coatings inhibit the sulfur, $H_2S$ sulfidation attack of the metal alloy surfaces of reactor internals and process units, and minimize the formation of sulfide scale that may also interfere with the efficient operation of the system.

Typical materials of construction for process equipment and associated piping used in hydrocarbon conversion processing can be used with the coating disclosed herein without having to increase metal content or modify metal alloys of the process units and piping. In one aspect, the above mentioned nickel complexes can be applied by a thermal spray process or plasma spray process. In another aspect, the aluminum-based coating can be applied by a reduction cure process and followed by oxidation, thus the application of the aluminum-based coating does not require high (e.g., greater than 700° C. (1292° F.)) application temperatures.

The coatings disclosed herein improve the operation and useful life of the process equipment, thus avoiding unnecessary shutdowns and maintenance of the equipment due to sulfidation attack and coke formation. Furthermore, the operations temperatures of the process can be increased even above the normally expected metal catalyzed coke onset temperatures, and still avoid metal catalyzed coke formation, thus increasing the efficiency of the catalyst used in the process. In another aspect, in-situ regeneration of the hydrocarbon catalyst can be performed in place inside of the reactor without risk of metal catalyzed coke formation or degradation of the catalyst itself.

DETAILED DESCRIPTION

In one aspect, coatings are provided for inhibiting, and in some aspects for preventing, the formation of metal catalyzed coke deposits on reactor components and other related process equipment used in hydrocarbon conversion processes at temperatures at or above about 350° C. (662° F.). These coatings and applications also can inhibit the corrosion of exposed metal alloy surfaces of such components and equipment due to sulfidation reactions with sulfur compositions in the feed stream. In some aspects, the coatings may comprise nickel coatings or complexes thereof; a paint application of aluminum that is cured under reducing conditions on the metal alloy surface or on another previously coated surface and other coatings described herein.

One common characteristic shared by certain aspects of the coatings is their resistance to $H_2S$ corrosion reactions and stability in reducing environments. The coatings adhere sufficiently to the metal alloy base surfaces to resist delamination and peeling from the metal alloy surfaces, even during high operation temperatures of greater than about 510° C. (950° F.). The thickness of the coatings will vary depending on the metal alloy substrate, hydrocarbon stream constituents, and process conditions, etc., but, in general, it is desired to apply as thin a coating as possible, while ensuring that the coatings are stable under the process conditions and providing sufficiently complete coverage of the metal alloy surfaces.

As used herein the terms "reactor", "process equipment," "process units," or "reactor components" shall include any and all process equipment and process units that are utilized in hydrocarbon conversion processes including any upstream and/or downstream equipment from the particular unit and/or ancillaries, such as furnace tubes, associated piping, heat exchangers, heater tubes, and the like.

Process units that can be treated successfully with the coatings herein to prevent metal catalyzed coke formation typically are fabricated from a metal alloy, most often a metal alloy containing iron, nickel, and/or chromium or containing chromium and molybdenum alloys. For example, such metal alloys include 300-series austenitic stainless steel (e.g., 304, 310, 316, 321, 347); Incoloy 800, Incoloy 802; Inconel 600, 601, 617, 625; Hastelloy C and X, 9 Chrome, Haynes 214; heat resistant casting such as HK-40, HK-50, Manaurite X™, and the like. Typical process equipment that is coated can include reactor surfaces, reactor components, catalyst screens, tubes, heat exchangers, heater tubes, associated piping and the like.

The coated process equipment may be used for any hydrocarbon conversion processes such as olefin cracking, hydrocracking, dehydrogenation reactions of light paraffins to olefins, and catalytic reforming processes, or other processes that are susceptible to the formation of metal catalyzed coke on the equipment surfaces due to contact with the hydrocarbon feed stream at high operating temperatures, e.g., at or above 350° C. (662° F.), and in reducing environments.

Some processes, such as naphtha reforming processes that utilize platinum impregnated zeolitic catalysts to produce benzene-toluene, cannot operate in the presence of significant amounts of sulfur compositions due to the sensitivity of the catalyst to sulfur/sulfide deactivation of the catalyst sites. Typically, such processes are operated at temperatures just below the metal catalyzed coke onset temperature in order to prevent coke formation and corrosion. An application of one of the metal catalyzed coke inhibiting coatings of the invention to the surfaces of such reactors and associated process components used for such sulfur-sensitive processes permits the use of increased process temperatures above the typical metal catalyzed coking onset temperatures for an uncoated surface, improving the efficiencies of the processes.

For processes utilizing sulfur-based coking inhibitors, such as $H_2S$, aspects of the coatings of the invention withstand both sulfidation corrosion of the metal alloy surfaces, as well as assist in the reduction of metal catalyzed coke formation. In such processes, $H_2S$ may be provided in the feed stream to inhibit metal catalyzed coke formation and carbonization of the metal alloy surfaces of the reactor and process equipment. In one such aspect, the $H_2S$ content of the feed is up to about 100 ppm, and this concentration of $H_2S$ may be adjusted based on the potential for coke formation for specific feeds, conversion processes and process equipment.

Such $H_2S$ levels in the hydrocarbon feed typically produce heavy sulfide scale on the metal alloy equipment surfaces, such as stainless steel surfaces, which can foul reactor components and interfere with the feed flow entering or leaving the reactor. Such fouling may cause undesirable pressure drops within the reactor, and, in some instances, may cause excessive pressure buildups and premature shutdowns of the process to avoid serious mechanical damage to reactor and reactor components. Thus, in another aspect, the coatings may be employed to inhibit formation of sulfide scale on the reactor and/or process equipment surfaces. In yet another aspect, the coatings of the invention inhibit substantial corrosion of the metal alloy surfaces over repeated thermal cycling of the conversion process.

The coatings, in one aspect, may be used in hydrocarbon conversion processes where a hydrocarbon feed stream is introduced into a reactor or process unit where the reaction temperatures are maintained at or above about 350° C. (662° F.) during process operation, and in another aspect from about 427° C. (800° F.) to about 590° C. (1094° F.). Suitable hydrocarbon feed streams may comprise any stream that is typically used in petroleum refining and processing operations, such as fuel, light petroleum gas (LPG), light cycle oil (LCO), naphtha, benzene, toluene, xylene, and the like that can be converted to a different hydrocarbon composition during such conversion processes.

Furthermore, in yet another aspect, the coatings utilized on the metal alloy surfaces of equipment used for such hydrocarbon conversion processes may be applied and used under reducing conditions. Such reducing conditions typically are the result of a feed stream comprised of hydrocarbons or hydrocarbons admixed with hydrogen. Such processes typically do not employ steam, $CO_2$, CO or other sources of oxidants or oxidizing agents that provide significant oxidation inhibition of coke formation. The specific reducing conditions may depend on the process conditions, reactants, and the composition of the metal alloy surfaces. In one such aspect, the coated metal alloy surfaces are exposed to feed streams and conversion processes maintained continuously under reducing conditions, or under substantially continuous reducing conditions (for example, where oxidants present in the hydrocarbon stream or the process system, or available oxygen present on or in the coated surface, are depleted during the conversion processes). In another aspect, the metal alloy surfaces may be exposed to oxidizing conditions during in situ regeneration of a catalyst, or other processes, but are otherwise maintained under reducing conditions. In still another aspect, the metal alloy surfaces are maintained under reducing conditions without a source replenishing oxygen or oxidants that may have been in the system.

In one aspect of the invention, at least a portion of a surface of a reactor or reactor components exposed to a hydrocarbon feed stream is coated with a nickel-aluminum ("Ni—Al") bonded coating layer. The bonded coating layer is applied by thermal spray processing methods or in the form of plasma spray coating. While not bound by theory, it is believed that the oxidation of the Ni—Al coating during the thermal or plasma application provides coking reduction properties, as well as resistance to sulfidation reactions and other corrosion of the underlying metal alloy surfaces.

The Ni—Al bonded coating of this aspect is effective in a reducing hydrocarbon environment at temperatures of about 427° C. (800° F.) to about 590° C. (1094° F.), protecting the metal alloy surfaces of the reactor and related process equipment from carburization and substantially inhibiting metal catalyzed coke formation on the coated surfaces. In another aspect, the Ni—Al coating also passivates the metal alloy surface in the presence of $H_2S$ to inhibit the formation of FeS or other sulfur based scales. In other aspects, it is believed that the Ni—Al coating is effective to inhibit metal catalyzed coke formation and/or significant sulfur scaling at temperatures from about 590° C. (1094° F.) to less than about 650° C. (1202° F.).

The Ni—Al coating forms a metallurgical bond between the coating and the alloy metal surfaces of the reactor and related equipment effective to resist, and in many instances prevent, diffusion of hydrocarbons and/or $H_2S$ to the metal alloy surfaces. Metallurgical bonding as applicable herein, is evidenced (without limitation) as bonding between the coating and metal substrate that substantially resists delamination when the coated surfaces are subject to temperatures at or above metal catalyzed coking onset temperatures and/or are subject to thermal cycling above and below metal catalyzed coking onset temperatures, such as thermal cycling temperatures of about 50° C. (122° F.) or greater. It is believed, without being bound by theory, that such metallurgical bonding between the coatings and the metal alloy surfaces include primarily intermolecular or intergranular bonding. Accordingly, in addition to inhibiting sulfidation scaling, the coating is resistant to delamination from the metal alloy surface during extended process runs over a relatively wide range of temperatures where other coatings would delaminate as a result of thermal coefficient of expansion mismatches between the unacceptable coatings and metal alloy surfaces.

In another aspect, a nickel-chromium/chromium-carbide bonded coating is applied to the metal alloy surfaces of the process equipment and/or reactor. Such bonded coatings also can be applied by thermal spray "application" methods, such as by a plasma spray coating process to form metallurgical bonds with the metal alloy surfaces of the process unit. The nickel-chromium/chromium-carbide ("Ni—Cr/Cr-Carbide") coatings resist metal catalyzed coke formation in a reducing hydrocarbon environment at temperatures from about 427° C. (800° F.) to about 590° C. (1094° F.) and also inhibit corrosion of the metal alloy surfaces due to sulfidation reactions in the presence of $H_2S$ and other corrosive reactants. These coatings also resist delamination, and in many instances, the Ni—Cr/Cr-carbide coating will not delaminate at high operating temperatures and during repeated temperature cycling. In other aspects, it is believed that the Ni—Cr/Cr-Carbide coating is effective to inhibit coking and substantial sulfidation corrosion at temperatures from about 590° C. (1094° F.) to less than about 650° C. (1202° F.).

Where a plasma spray coating process is used to apply the coating to at least a portion of a reactor or process equipment surface, the coating typically is applied at the plasma spray process temperatures (e.g., around about 2000° C. (3632° F.)), while the reactor surface is a significantly lower temperature. A plasma spray applicator typically is supplied with a feed source of the metal to be coated onto the exposed metal alloy surfaces and an inert gas heated to ionization temperatures. As the resulting spray is directed to the metal alloy surfaces of the reactor, the hot metal-based coating strikes the cooler metal alloy surfaces of the reactor, condensing and solidifying into a coating that forms a metallurgical bond with the metal alloy surfaces. One source for such plasma spray applications is A&A Company, Inc., South Plainfield, N.J., which has various locations in the United States and elsewhere. Other coating application processes, such as other thermal application processes, that form a metallurgical bond between the coating and metal alloy surfaces may be used as well, depending on the specific application.

EXAMPLES

The following examples provide illustrations of reaction conditions where metal catalyzed coke is formed on uncoated metal alloy surfaces (Example 1) and sulfide scale and corrosion forms on uncoated metal alloy surfaces (Example 2). The examples also provide illustrations of aspects of the coatings of the invention utilizing Ni—Al and Ni—Cr/Cr-Carbide coatings (Examples 3-6).

After exposure to the hydrocarbon streams and process conditions discussed in the Examples, the surfaces of the metal alloy test samples were examined by scanning electron microscopy (SEM). The failure of a coating was indicated (without limitation) by evidence from the SEM analysis that exposure of the coated surfaces to the hydrocarbon stream and process conditions over an extended period of time typical of commercial operation service (e.g. days or longer) would result in significant metal catalyzed coking, sulfidation corrosion and/or delamination of the coating. Such evidence included, but was not limited to, the formation of one or more filaments or fibers of metal catalyzed carbon on the metal and/or coated surfaces, flaking or scaling on such surfaces due to sulfidation corrosion or delamination, or partial delamination of the coating.

These examples are for illustrative purposes only and do not limit the invention in any respect:

Example 1

An uncoated sample coupon comprising 347 stainless steel was used to establish a basis for comparison with other examples. The coupon was placed in a hydrocarbon feed stream comprised of a hexane feed stream with no $H_2S$ and about 78% $H_2$. The hydrocarbon-only feed stream was passed over the uncoated coupon for about 168 hours and at a temperature of about 560° C. (1040° F.) and a pressure of about 414 kPa (60 psig). It was observed that substantial metal catalyzed coke was produced on the metal alloy surface.

Example 2

Another uncoated metal coupon comprising 347 austenitic stainless steel also was used to establish a basis of comparison where a sulfur compound was used as a metal catalyzed coking inhibitor. A feed stream was passed over the coupon containing isobutane and 30 wt ppm $H_2S$ in about 0.53% $H_2$, for about 168 hours at a temperature of about 590° C. (1094° F.) and a pressure of about 207 kPa (30 psig). The results showed little, if any, metal catalyzed coke on the coupon. However, a significant quantity of sulfide scale was produced such that it would result in fouling of the reactor components and related equipment.

Example 3

A sample coupon comprising 347 stainless steel was coated with a Ni/Al bonded coating of one aspect of the invention using a plasma spray technique. A feed stream was introduced over the coupon containing hexane with no $H_2S$ and about 78% $H_2$, and at a temperature of about 560° C. (1040° F.) and a pressure of about 414 kPa (60 psig). After about 168 hours, there were essentially no metal catalyzed coke deposits on the coated metal coupon. Thus, the coating efficiently inhibited the formation of coke on the coated surface.

Example 4

A coating comprising a Ni—Al bonded coating of one aspect of the invention was applied to a metal coupon of 347 austenitic stainless steel using a plasma spray technique. This coating was found to be metallurgically bonded to the base metal of the coupon. A feed stream was passed over the coupon containing isobutane and 30 wt ppm $H_2S$ in about 0.53% $H_2$, for about 168 hours at a temperature of about 590° C. (1094° F.) and a pressure of about 207 kPa (30 psig). At the conclusion of this test, there was essentially no catalyzed coke deposited on the coupon surfaces, nor was there a significant sulfide scale formed on the coupon surface. Thus, the coating minimized and/or prevented the corrosion of the metal due to sulfidation attack in the presence of the $H_2S$ in the feed stream, the reducing environment and the high process temperature conditions.

Example 5

A metal coupon of 347 stainless steel was coated as set forth above in Example 4. The coupon was subjected to the same feed stream and conditions, except that the test was allowed to run for 40 days (960 hours) and at a more severe condition comprising only about 0.25% $H_2$. At the conclusion of the test, there was essentially no metal catalyzed coke formation on the coupon surfaces and substantially no corrosion of the coupon due to sulfidation reactions with the $H_2S$ in the reducing environment and high temperatures used in the test.

Example 6

A coating comprising a Ni—Cr/Cr-carbide bonded coating was applied to a metal coupon of 347 austenitic stainless steel using a plasma spray technique. This coating was found to be metallurgically bonded to the base metal of the coupon. A feed stream was introduced containing isobutane and 30 wt ppm $H_2S$ in about 0.53% $H_2$, which was passed over the coupon for about 168 hours at a temperature of about 590° C. (1094° F.) and a pressure of about 207 kPa (30 psig). There was essentially no metal catalyzed coke deposited on the coupon surfaces after 168 hours. It also was observed that the coating was further enriched in Cr—S, which provides sulfidation protection by minimizing and/or preventing the sulfidation reaction between the coated metal alloy and the $H_2S$ in the feed stream.

Another aspect of the invention comprises an aluminum metal-based paint, e.g., aluminum or aluminum based particles and/or micro particles in a resin base or other carrier, applied as a painted coating on reactor components and related process equipment and forming a metallurgical bond between the coating and the metal alloy surfaces of the process equipment. The aluminum based paint may be applied to the metal alloy surfaces at relatively low temperatures, and then cured at elevated temperatures ranging from about 500° C. (932° F.) to about 750° C. (1382° F.), for example, and in a reducing environment, or in another aspect a curing process at about 600° C. (1112° F.) exclusive of the presence of substantial oxidizers may be used. Such application conditions allow the burn off of resins, binder, hydrocarbons, etc. in the paint and sinters the aluminum particles to form a coating layer sufficient to prevent diffusion of hydrocarbons, $H_2S$ or other corrosive agents to the underlying metal alloy surfaces.

The aluminum based paint may be applied in an amount to provide coatings having a thickness appropriate for a specific process and conversion equipment. In one aspect, the aluminum paint was applied in an amount sufficient to provide a cured coating of at least about 20 microns on the metal alloy surfaces. In this aspect, the relatively low application temperatures of the aluminum paint based coating is desirable as the use of such temperature substantially reduces the risk of distortion or damage to the reactor components, particularly those susceptible to warping at high temperatures used in Alonizing and similar high temperature coating procedures.

In one aspect, the cured, Al paint coated surfaces of the process unit are exposed to an oxidizing environment, such as by exposing the cured surfaces to air, $CO_2$ or CO. In some instances, the oxidation of the aluminum coated surface also may be at temperatures ranging from about 300° C. (572° F.) to about 600° C. (1112° F.). In the oxidizing environment, the surface of the aluminum coating oxidizes to further protect the coated metal alloy surface. The aluminum coating of this aspect surprisingly inhibits metal catalyzed coke formation in a reducing hydrocarbon environment, and resists loss of integrity of the coating due to thermal cycling. Because the coating surface does not react with sulfur compositions, the coating also substantially inhibits sulfidation reactions with, and corrosion of, the coated metal alloy surfaces.

Other Al containing coatings, such as $Al_2O_3$—$TiO_2/SiO_2$ ceramic coatings, that would be expected to protect the metal alloy surfaces were applied with a plasma spray process, but they disbanded and did not protect the metal alloy surfaces from metal catalyzed coke formation or sulfide reactions. Similarly, Al diffused into the metal alloy surface using an alonization process, which would be expected to protect the metal alloy surfaces from sulfidation corrosion and coke formation, was ineffective in the presence of hydrocarbons and sulfur compositions under reducing conditions.

The aluminum-based paint also can be used to coat various metal types to prevent high temperature corrosion of other reactor/process equipment. The coating formed by the cured aluminum coating forms a metallurgical bond with the metal alloy surfaces and inhibits the diffusion of components (such as Fe) from the metal alloy to the exposed coated surfaces. For example, the aluminum paint may be coated directly onto a stainless steel alloy, such as 347 austenitic stainless steel. When cured, the bonded coating maintains adhesion to the metal alloy substrate at elevated temperatures and after repeated temperature cycling. In another aspect, the aluminum paint coating also protects against metal catalyzed coke formation when applied to a 1¼Cr, ½ Mo base metal, which has no Ni or Co. Thus, it is not necessary for the metal alloy substrate to be rich in nickel, cobalt or related Ni or Co compositions.

The aluminum paint based coatings also may be utilized in hydrocarbon conversion processes where the addition of oxidants is not desired. Examples of such processes include those where even a small amount (e.g., 100 ppm) of $CO_2$, or CO (which may form $CO_2$ in the presence of water) in the feed stream or reactor is sufficient to poison or deactivate a catalyst necessary for the conversion process. The coating cured and maintained in a reducing environment will resist metal catalyzed coke formation and will inhibit sulfidation or other corrosion reactions at the alloy metal surface.

In yet another aspect of the invention, the aluminum metal-based paint can be applied as a sealant on top of a nickel-aluminum coating that has already been applied and metallurgically bonded to the metal alloy surface of a reactor or other process unit, such as that discussed above. In this aspect, the aluminum paint based coating fills pores or other spaces or gaps in the Ni—Al coating to form a substantially continuous layer on the metal alloy surface of a reactor, reactor components or other associated equipment. Thus, the Al/Ni—Al coating provides an enhanced, metal catalyzed coke inhibiting surface, which also is resistant to sulfidation or other corrosion reactions.

Examples

The following examples provide illustrations of Al composition coatings and alonized surfaces that were expected to have been effective in protecting the metal alloy surfaces, but which failed to provide significant protection from metal catalyzed coke formation and/or sulfidation scaling. (Examples 7-11). The examples also illustrate aspects of the Al coatings of the invention (Examples 12-18). The samples were subject to SEM analysis as described above for Examples 1 to 6, using the same criteria for failure of the coating. These examples are illustrative only and do not limit the invention in any respect.

Example 7

A coating was applied to a metal coupon comprising 347 austenitic stainless steel by plasma spraying a composition of nano-particle $Al_2O_3$—$TiO_2$. Such an Al containing coating would be expected not to coke and to have sufficient ductility such that thermal cycling up to about 600° C. (1112° F.) should not cause any disbonding of the coating. A hydrocarbon feed stream was introduced over the coupon comprising pure isobutane, about 30 weight ppm $H_2S$ and about 0.53% $H_2$. The feed stream was passed over the coupon at 590° C. (1094° F.) and 207 kPa (30 psig) pressure for about 168 hours. However, the coating readily delaminated in the hydrocarbon environment with $H_2S$ present, and therefore did not provide significant protection from metal catalyzed coke formation or corrosion for the metal alloy surface.

Example 8

A coating comprising an $Al_2O_3$—$SiO_2$—$Cr_2O_3$ diffusion bonded coating was applied to a metal coupon of 347 austenitic stainless steel using a coating process that is similar to alonizing and which has an application temperature of about 815° C. (1499° F.). A feed stream was introduced over the coupon containing isobutane and 30 wt ppm $H_2S$ in about 0.53% $H_2$. The feed was passed over the coupon for about 168 hours at a temperature of about 590° C. (1094° F.) and a pressure of about 207 kPa (30 psig). It also was expected that this coating would not coke. Significant metal catalyzed coke deposits, however, formed on the coupon surfaces after 168 hours. Thus, even with $H_2S$ used as a metal catalyzed coking inhibitor in the feed stream, the coating provided little substantial resistance to metal catalyzed coke reactions.

Example 9

A coating comprising an $Al_2O_3$—$SiO_2$ bonded coating was applied at a temperature of about 815° C. (1499° F.) to a metal coupon of 347 austenitic stainless steel using a plasma spray technique. A feed stream was passed over the coupon containing isobutane and 30 ppm $H_2S$ in about 0.53% $H_2$, for about 168 hours at a temperature of about 590° C. (1094° F.) and a pressure of about 207 kPa (30 psig). The coating delaminated, however, from the metal coupon and metal catalyzed coke formed on the metal alloy surface. Thus, this coating applied at lower temperatures also provided little reduction of metal catalyzed coking even with the $H_2S$ used as a metal catalyzed coking inhibitor in the feed stream.

Example 10

The coating, coupon and process conditions of Example 9 were used where the curing temperature of the $Al_2O_3$—$SiO_2$ coating was reduced to a lower temperature of about 590° C. (1094° F.) so as to minimize the formation of surface Fe—Al intermetallic complexes. It was expected that applying the bonded coating at a lower temperature would reduce temperature related defects in the coating to provide the expected inhibition of coking on that alloy surface with this composition. However, increasing the cure time by a factor of 10 did not produce a metallurgical bond between the coating and the metal, and the coating again disbanded after testing for about 168 hours at a temperature of about 590° C. (1094° F.).

Example 11

An aluminum coating was applied to a 347 austenitic stainless steel heater tube by alonizing, as described in U.S. Pat. No. 6,803,029 (Dieckmann), where an Al coating is diffused into the metal base of the reactor at temperatures of about 800° C. (1472° F.) to about 1000° C. (1832° F.). The alonized aluminum coating was expected to result in a metallurgically bonded coating that does not disbond, per the prior art, and would further be expected to be inert to hydrocarbons. A feed stream comprising hexane and about 78% $H_2$ without any $H_2S$ present, was passed through the coated heater tube for about 17,520 hours (about two years) and at a feed temperature of about 560° C. (1040° F.) and a pressure of about 414 kPa (60 psig). Significant amounts of metal catalyzed coke formed at the coated surface.

Example 12

An application of an aluminum paint (such as CP4010, supplied by Aremco Products, Inc., Valley Cottage, N.Y.) was used to coat a type 347 austenitic stainless steel metal coupon, in one aspect of the invention. The painted stainless steel coupon was cured in a reducing atmosphere comprising $H_2$ at about 650° C. (1202° F.) for about 4 to 8 hours and then cooled to room temperature. A feed stream was thereafter introduced over the coupon containing an isobutane feed and 30 wt ppm $H_2S$ in about 0.53% $H_2$, for about 168 hours at a temperature of about 590° C. (1094° F.) and a pressure of about 207 kPa (30 psig). There was essentially no metal catalyzed coke on the coupon surface after about 168 hours, nor was there a substantial sulfide scale formed in the presence of the $H_2S$ in the feed. Thus, the coating resisted coke formation and inhibited and/or prevented the corrosion of the stainless steel substrate due to sulfidation or other reactions.

Example 13

A 347 austenitic stainless steel coupon was coated using an aluminum paint as set forth in Example 12 above, and was exposed to essentially the same feed stream at the temperature and partial pressure used in Example 12. The coupon in the example remained in the feed stream for one year (8,760 hours). There was essentially no metal catalyzed coke formed on the coupon surface at the conclusion of the test. The corrosion rate was reduced from the typical rate from about 0.99 mpy, for a type 347 stainless steel metal with no aluminum coating, to about 0.46 mpy for the aluminum coated sample coupon.

Example 14

A coupon and aluminum coating as set forth in Example 12, was subject to a different feed stream and conditions. A feed stream comprising hexane with about 78% $H_2$ without any $H_2S$ present was passed over the coated coupon for about 168 hours at a temperature of about 560° C. (1040° F.) and a pressure of about 414 kPa (60 psig). At the conclusion of the test, there was essentially no metal catalyzed coke formed on the coated surface.

Example 15

The coating of Example 14 was applied to a coupon comprising 1¼ Cr and ½ Mo under the same test conditions as Example 14 above for about 168 hours. At the conclusion of the test, there was essentially no metal catalyzed coke formed on the coated surface.

Example 16

The aluminum paint used in Example 12 was applied over a Ni/Al bonded coating layer previously applied to a sample metal coupon of 347 austenitic stainless steel in another aspect of the invention. The paint was cured as set forth in Example 12 above. A feed stream was then introduced over the coupon containing isobutane and 30 wt ppm $H_2S$ in about 0.53% $H_2$ at a temperature of about 590° C. (1094° F.) and pressure of about 207 kPa (30 psig) for about 168 hours. At the conclusion of the test, there was essentially no metal catalyzed coke deposited on the coupon surface. There also was little, if any, evidence of scaling on the coated surfaces or other evidence of significant corrosion from sulfidation or other reactions.

Example 17

The sample coupon with the Ni/Al and cured Al paint coating of Example 16 were subject to different test conditions. A feed stream comprising only a hydrocarbon feed containing a hexane feed stream with about 78% $H_2$ without any $H_2S$ present was passed over the coated coupon for about 336 hours at a temperature of about 560° C. (1040° F.) and a pressure of 414 kPa (60 psig). At the conclusion of the test, there was essentially no metal catalyzed coke formed on the coated surface.

Example 18

The Ni/Al bonded coating with the additional cured, aluminum paint coating of Example 16 above was applied to a test set of reactor catalyst screens (e.g., internal components) and installed into a commercial reactor for test purposes and allowed to operate under the above referenced conditions of Example 16 above for about one year of testing under commercial operating conditions. At the conclusion of this test, the reactor internal components did not show significant metal catalyzed coke deposits, and there was little, if any, evidence of corrosion of the coated surfaces.

As mentioned above, the above discussed coatings may be applied to reactor interior surfaces, piping, etc. their entirety or portions thereof, prone to forming metal catalyzed coke under normal operating conditions (e.g., temperatures at or above 350° C. (662° F.)). As also mentioned above, the coating thickness is dependent on the specific coating composition, the hydrocarbon conversion process and reactor design, as well as the equipment surfaces subject to coking and the amount of coking inhibitors in the process stream that may cause corrosion of the equipment metal alloy surfaces. Similarly, the application of the coating can be extended beyond just a single reactor or series of reactors to also include upstream or downstream equipment, furnace tubes, heat exchangers, and/or piping, for example.

The coatings may be of particular benefit when applied to reactor components used to manage the hydrocarbon flow and/or other resistant flow through a reactor. For example, the coatings may be used to inhibit coking and corrosion of the surfaces of the catalyst support grids, perforated plates, reactor center pipes, catalyst transfer pipes, and catalyst screens used to retain solid particle, granular, or other catalyzed materials to prevent the loss of catalyst into the main body of the reactor.

With respect to catalyst screens, the screen structure may cover substantially the entire internal surface of the reactor. The catalysts that are contained behind the catalyst screens typically are quite small and can have diameters from about 0.79 mm (1/32 inch) to about 1.58 mm (1/16 inch). The space between the slots or openings of the screen must therefore be smaller than the diameter of the catalyst in order to prevent the catalyst from passing through the spaces.

When coke formation occurs on the catalyst screen, the slots or openings in and between screens can become blocked, reduced or, at times prevent adequate flow of hydrocarbon feed streams through the screens to get to the catalyst for conversion and/or reaction at the catalyst. Thus, the above coatings applied to the reactor internals, heater tubes, and related component screens inhibit the formation of the metal catalyzed coke that would otherwise reduce the efficiency, and eventually require a shut down of the reactor. Similarly, in systems where $H_2S$ is present as a coking inhibitor or otherwise as a component of the hydrocarbon stream, the above coating inhibits the corrosion of the screens which can result in enlargement of the screen openings or slots, which in turn can result in the loss of catalyst from behind the screen and into the main body of the reactor.

Similarly, a heat exchanger or a furnace tube can also be coated with the metal-based coating to prevent coke formation along the inner surfaces of the heating tubes. Furnace tubes can also be coated on both internal and external surfaces. When coke deposits are formed on the surfaces of the heating tubes, hot spots can develop resulting in an uneven heating spectrum, inefficient heating, and corrosion, and deformation of the metal alloy surfaces of the equipment.

The results of the previous Examples 1-18 have been summarized in the Table below.

TABLE

| Example No. | Coating | Feed Stream | Approx. Hours Tested | Approx. Temp. Tested | Results |
|---|---|---|---|---|---|
| 1 | None | Hexane, 78% $H_2$ | 168 hours | 560° C. (1040° F.) | Formed Metal Catalyzed Coke |
| 2 | None | isobutane, 30 wt ppm $H_2S$, and 0.53% $H_2$ | 168 hours | 590° C. (1094° F.) | Essentially No Metal Catalyzed Coke; But substantial Sulfide Scale/corrosion |
| 3 | Ni/Al | Hexane, 78% $H_2$ | 168 hours | 560° C. (1040° F.) | Essentially No Metal Catalyzed Coke |
| 4 | Ni/Al | isobutane, 30 wt ppm $H_2S$, and 0.53% $H_2$ | 168 hours | 590° C. (1094° F.) | Essentially No Metal Catalyzed Coke; Essentially No Sulfide Scale/corrosion |
| 5 | Ni/Al | isobutane, 30 wt ppm $H_2S$, and 0.25% $H_2$ | 960 hours (40 days) | 590° C. (1094° F.) | Essentially No Metal Catalyzed Coke, Essentially No Sulfide Scale/corrosion |
| 6 | Ni—Cr/Cr-Carbide | isobutane, 30 wt ppm $H_2S$, and 0.53% $H_2$ | 168 hours | 590° C. (1094° F.) | Essentially No Metal Catalyzed Coke; Essentially No Sulfide Scale/corrosion |
| 7 | $Al_2O_3$—$TiO_2$ | isobutane, 30 wt ppm $H_2S$, and 0.53% $H_2$ | 168 hours | 590° C. (1094° F.) | Coating Delaminated |
| 8 | $Al_2O_3$—$SiO_2$—$Cr_2O_3$ (Cured at 815° C. (1499° F.)) | isobutane, 30 wt ppm $H_2S$, and 0.53% $H_2$ | 168 hours | 590° C. (1094° F.) | Formed Metal Catalyzed Coke |
| 9 | $Al_2O_3$—$SiO_2$ (Cured at 815° C. (1499° F.)) | isobutane, 30 wt ppm $H_2S$, and 0.53% $H_2$ | 168 hours | 590° C. (1094° F.) | Coating Delaminated and Formed Metal Catalyzed Coke |
| 10 | $Al_2O_3$—$SiO_2$ Reduced curing temperature, curing time increased by 10 | isobutane, 30 wt ppm $H_2S$, and 0.53% $H_2$ | 168 hours | 590° C. (1094° F.) | Coating delaminated |
| 11 | Alonized Al | Hexane, 78% $H_2$ | 17,520 hours (2 years) | 560° C. (1040° F.) | Formed Metal Catalyzed Coke |
| 12 | Al - Reduction Cured | isobutane, 30 wt ppm $H_2S$, and 0.53% $H_2$ | 168 hours | 590° C. (1094° F.) | Essentially No Metal Catalyzed Coke; Essentially No Sulfide Scale/corrosion |
| 13 | Al - Reduction Cured | isobutane, 30 wt ppm $H_2S$, and 0.53% $H_2$ | 8,760 hours (one year) | 590° C. (1094° F.) | Essentially No Metal Catalyzed Coke; Sulfide Scale/corrosion rate reduced from about 0.99 mpy to about 0.46 mpy |
| 14 | Al - Reduction Cured | Hexane, 78% $H_2$ | 168 hours | 560° C. (1040° F.) | Essentially No Metal Catalyzed Coke |

TABLE-continued

| Example No. | Coating | Feed Stream | Approx. Hours Tested | Approx. Temp. Tested | Results |
|---|---|---|---|---|---|
| 15 | Al - Reduction Cured on 1¼ Cr and ½ Mo Coupon | Hexane, 78% $H_2$ | 168 hours | 560° C. (1040° F.) | Essentially No Metal Catalyzed Coke |
| 16 | Ni/Al and Al | isobutane, 30 wt ppm $H_2S$, and 0.53% $H_2$ | 168 hours | 590° C. (1094° F.) | Essentially No Metal Catalyzed Coke; Essentially No Sulfide Scale/Corrosion |
| 17 | Ni/Al and Al | Hexane, 78% $H_2$ | 336 hours | 560° C. (1040° F.) | Essentially No Metal Catalyzed Coke |
| 18 | Ni/Al and Al | isobutane, 30 wt ppm $H_2S$, and 0.53% $H_2$ | Approx. 8,760 hours (one year) | Commercial operation conditions (e.g., 590° C. (1094° F.)) | Essentially No Metal Catalyzed Coke; Essentially No Sulfide Scale/Corrosion |

The foregoing description and examples illustrate aspects of the invention and the benefits to be afforded with the use thereof. It will be further understood that various changes in the details, materials, and coating application and thickness which have been herein described may be made by those skilled in the art within the principle and scope of the coating of the invention as expressed in the appended claims. Accordingly, the above description and examples should be regarded in an illustrative rather than a restrictive sense.

The invention claimed is:

1. A method for the reduction of metal catalyzed coke formation on metal alloy component surfaces exposed to a hydrocarbon feed stream under reducing conditions comprising:
    applying a coating containing complexes of nickel and aluminum, complexes of nickel, chromium and chromium carbide, or sintered aluminum to the metal alloy surfaces in contact with the feed stream;
    forming a metallurgical bond between metal complexes of the coating and the metal alloy surfaces in contact with the coating;
    the metal alloy component surfaces provided with an amount of the coating effective to inhibit coke formation on the exposed metal alloy surfaces under reducing conditions; and
    wherein the coating of sintered aluminum is applied by coating the metal alloy surface with a media containing aluminum and sintering the coating under reducing conditions at temperatures of less than about 800° C. (1472° F.) and applied in an amount to provide a layer comprising aluminum with a thickness of at least about 20 microns.

2. The method of claim 1, wherein the coating is applied in an amount effective to inhibit sulfidation corrosion of the metal alloy surfaces the presence of the hydrocarbon feed stream containing sulfur compounds under reducing conditions at temperatures greater than about 350° C. (662° F.) but less than about 650° C. (1202° F.).

3. The method of claim 2, wherein the coating is effective to prevent substantial metal catalyzed coking after repeated thermal cycling.

* * * * *